United States Patent [19]

Mottate

[11] 4,390,215

[45] Jun. 28, 1983

[54] BALL BEARING SLIDE UNIT FOR LINEAR MOTION

[75] Inventor: Tatsuo Mottate, Yokohama, Japan

[73] Assignee: Nippon Thompson Co., Ltd., Tokyo, Japan

[21] Appl. No.: 294,765

[22] Filed: Aug. 20, 1981

[30] Foreign Application Priority Data

Apr. 10, 1981 [JP] Japan .............................. 56-51825[U]
Apr. 14, 1981 [JP] Japan .............................. 56-53508[U]
Jul. 17, 1981 [JP] Japan ............................. 56-106417[U]

[51] Int. Cl.³ ............................................. F16C 29/06
[52] U.S. Cl. ..................................................... 308/6 C
[58] Field of Search .............. 308/6 C, 6 R, 6 A, 3 R, 308/3.8, DIG. 11

[56] References Cited

U.S. PATENT DOCUMENTS

| | | | |
|---|---|---|---|
| 3,540,782 | 11/1970 | Worm | 308/6 C |
| 3,552,806 | 1/1971 | Weasler et al. | 308/6 C |
| 3,940,186 | 2/1976 | Nilsson | 308/6 C |
| 4,309,061 | 1/1982 | Teramachi | 308/6 C |

*Primary Examiner*—Stuart S. Levy
*Assistant Examiner*—Thomas R. Hannon
*Attorney, Agent, or Firm*—Trexler, Bushnell & Wolters, Ltd.

[57] ABSTRACT

A ball bearing slide unit for linear motion is mounted on a track rail of rectangular cross section having track surfaces at both of its side surfaces, and is provided with track surfaces opposing said track surfaces on said track rail, with linear return holes running parallel to said track surfaces, and with direction changing paths which connect corresponding ends of said track surfaces and said return holes respectively, and is formed with circulating paths where groups of balls endlessly circulate supporting a load and rolling between both said track surfaces. The slide unit is characterized in that it comprises plastic side plates wherein circular arc shaped direction changing paths are formed for connecting said track surfaces and return holes. Track plate retainers are mounted on both ends of the slide unit body externally contacting the ends of track plates and rod shaped ball retaining members. The plate retainers have track surfaces and provide the ends of said return holes. The retainers form part of said direction changing paths with the side plates which are furtehr externally mounted, and which are formed with a recess of downward facing channel shape, said recess having resilient short claw members which are perpendicularly bent and projecting at the top ends of its inner edges, and are provided, at a position contacting the track surface end of said track plate, with half circular cuts, and which are provided, at a position contacting the ends of said return holes, with circular holes. The ball retainers prevent the group of balls from falling out of the track surface of the slide unit, and are made of thin metallic rod members and formed into main member portions of straight rod shape, bent pieces bent perpendicularly from both ends thereof and hook shaped pieces at the tip of said bent pieces, and which are hooked onto the side plate of the slide unit by said bent pieces and hook shaped pieces.

4 Claims, 17 Drawing Figures

BALL BEARING SLIDE UNIT FOR LINEAR MOTION

BACKGROUND OF THE INVENTION

1. Field of the Invention

The present invention relates to a ball bearing slide unit for linear motion wherein said slide unit is mounted on a track rail of rectangular cross section which is provided with linear track surfaces symmetrically at both vertical side surfaces, and is provided with track surfaces opposing said track surfaces on said track rail, with linear return holes running parallel to said track surfaces, and with direction changing paths which connect the both ends of said track surfaces and said return holes respectively, and is further formed with circulating paths where a group of balls endlessly circulate supporting a load and rolling between opposing track surfaces. The present invention particularly relates to the circulating path in which the group of balls, which supports said slide unit endlessly circulates.

2. Description of the Prior Art

In the prior art ball bearing structure for linear motion, as shown in FIG. 16 and FIG. 17, the mounting surface 50, on which the slide unit 49 mounts on the track rail 48, is an inclined surface. The group of balls 53 supporting the load between the track surface 51 of the track rail 48 and the track surface 52 of the slide unit 49 are always pressed against both track surfaces 51, 52 by the imposed load. Therefore, no preload against the track surface is necessary. However, side plate 56, in which direction changing path 55 is formed to circulate the balls 53 from the load zone formed by both track surfaces 51, 52 to the no load zone formed by return hole, is directly connected to the ends of said load zone formed by both track surfaces 51, 52 and to the ends of return holes, which are the linear paths of the slide unit 49, and said track surface 52 and return hole 54 are located in parallel and close together at position normal to the mounting surface 50. Therefore, as shown in FIG. 17, an abrupt direction change of the ball 53 is made at a small portion of length l. At this direction changing path 55, there will occur friction between the ball 53 and the circularly shaped outer wall surface of the direction changing path 55. A locking state will occur when the neighbouring balls 53 are pressed against said wall. Thus defects which prevent the smooth progression of the balls existed. In order to overcome these defects, it was necessary to increase the distance between the track surface 52 and the return hole 54 and to increase said distance l to make the curvature of direction changing path 55 small. This resulted in large size of the slide unit in the longitudinal and left and right directions, Also, if size was not increased, load zone had to be decreased. Since this results in the increase of load per unit length at the load zone, there was a defect that the load capacity of the slide unit 49 was decreased.

Also, the prior art side plate of the ball bearing slide unit for linear motion was usually made by casting and was heavy. Since the direction changing path provided has to be machined, it was difficult to make it into any complex curved surface, and machining and material costs were high. Besides, since its weight is large, when assembled, the total weight became high. Thus there was a limit in its use for assembly as part of the machine parts. Therefore, there was a demand of a side plate having a direction changing path with less defects such as described above.

SUMMARY OF THE INVENTION

In a ball bearing slide unit for linear motion wherein said slide unit is mounted on a track rail of rectangular cross section which is provided with linear track surfaces symmetrically at both vertical side surfaces, and is provided with track surfaces opposing said track surfaces on said track rail, with linear return holes running parallel to said track surfaces, and with direction changing paths which connect correspondingly ends of said track surfaces and said return holes respectively, and is further formed with circulating paths where groups of balls endlessly circulate supporting a load and rolling between both track surfaces, the present invention is a ball bearing slide unit for linear motion, characterized in that there are provided:

plastic side plates wherein circular arc shaped direction changing paths are formed for connecting both ends of linear paths of said track surfaces and return holes, and a steel guide plate is embedded at the innermost peripheral surface of said direction changing paths, said steel guide plate having a circular arc edge surface flush with said direction changing paths and being integrally molded with said plastic side plate;

track plate retainers which are mounted on both end surfaces of said slide unit body externally contacting the ends of the track plates having track surfaces and the ends of said return holes. Said track plate retainers are plate shaped and form part of said direction changing paths. The side plates are mounted externally of the plate retainer. The plate retainers are formed with a recess of downward by facing channel shape, said recess having resilient short claw members which are perpendicularly bent and projecting at the top ends of both inner edges thereof. The plate retainers are provided, at positions contacting the track surface end of said track plate, with half circular cuts forming part of direction changing path, and further are provided, at positions contacting the ends of said return holes, with circular holes forming part of direction changing path. The side surfaces of said cuts and said circular holes at the side where they contact said side plate are formed slanted so as to form spatial circular arc shaped curved surfaces; and ball retainers which are made by thin metallic rod member and formed into main member portion of straight rod shape, bent pieces bent perpendicularly from both ends thereof and hook shaped pieces at the tip of said bent pieces, and which are hooked onto the side plate of the slide unit by said bent pieces and hooked shaped pieces.

The invention is also directed to said side plate, said track plate retainer and said ball retainer of said slide unit, individually.

The object of the present invention is to provide a slide unit in which there is provided endlessly circulating path where said group of balls circulate, said path including a direction changing path wherein the guiding of the direction change of the group of balls which rollingly support said slide unit is smooth and the sliding resistance is less, and to provide a slide unit which is light and capable of quantity production. Another object of the present invention is to provide a side plate of the slide unit forming a direction changing path between the load and no load zones of the circulating path which is light, capable for quantity production, and having less wear.

Another object of the present invention is to provide a track plate retainer of the slide unit which supports the track plates fitted on the slide unit so as no play will be caused to the preload device of said track plate, and which is capable of smoothly guiding the direction change of the balls.

Still another object of the present invention is to provide a ball retainer which retains the group of balls that are mounted in the slide unit inside the track surfaces and which is easy to install or remove.

DETAILED DESCRIPTION OF THE EMBODIMENT

Figure 1:
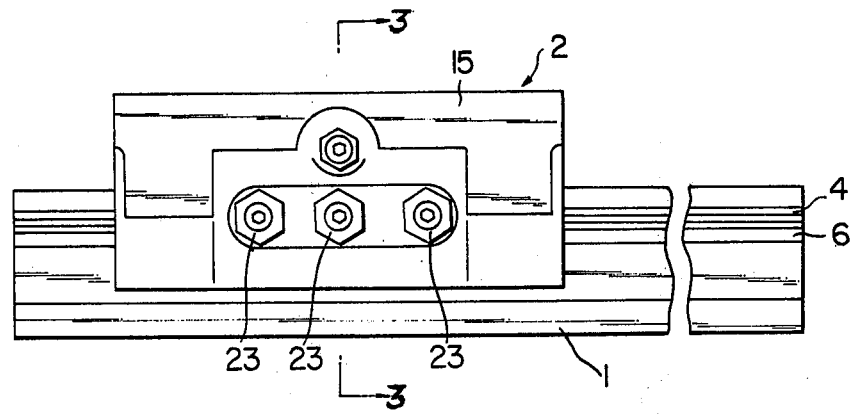
FIG. 1 is a side view of an embodiment of the ball bearing unit for linear motion.

The embodiment of ball bearing unit for linear motion according to the present invention has an arrangement as shown in FIG. 1 through FIG. 4. Namely, this ball bearing unit for linear motion consists of a linear track rail 1 and a slide unit 2 which mounts on said track rail 1 and moves linearly. Track rail 1 has a rectangular cross section and is provided with half cylindrical shape track surfaces 4 at both vertical outer side surfaces 6, 6 lengthwise and symmetrically left and right and in which balls 3 roll. On said slide unit 2 there are fitted track plates 16, which are of rectangular bar shape, symmetrically at inner surfaces 7, 7 which oppose each other in a channel shape of slide unit body 15 at positions which oppose said track surfaces 4, 4, said track plates 16 are provided with track surfaces 5 being parallel linear paths of half cylindrical shape in which balls 3 roll.

Figure 2:
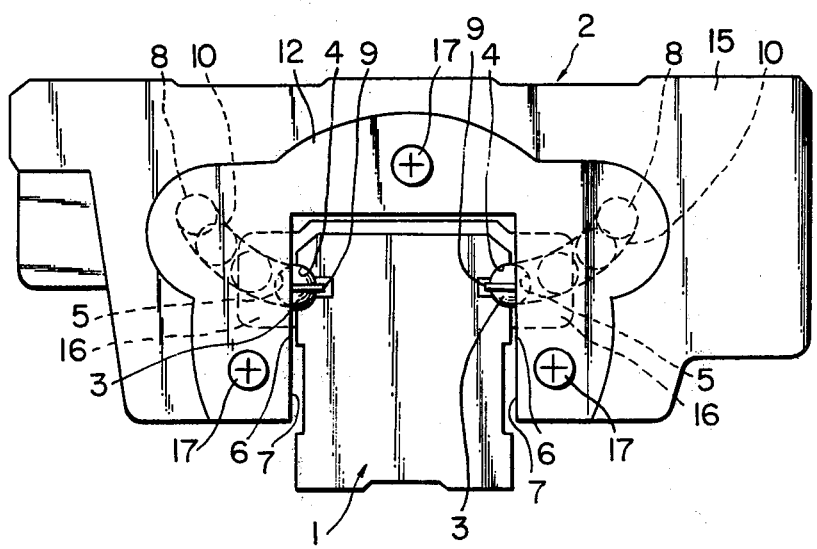
FIG. 2 is an elevational view showing the end surface of above.
Figure 3:
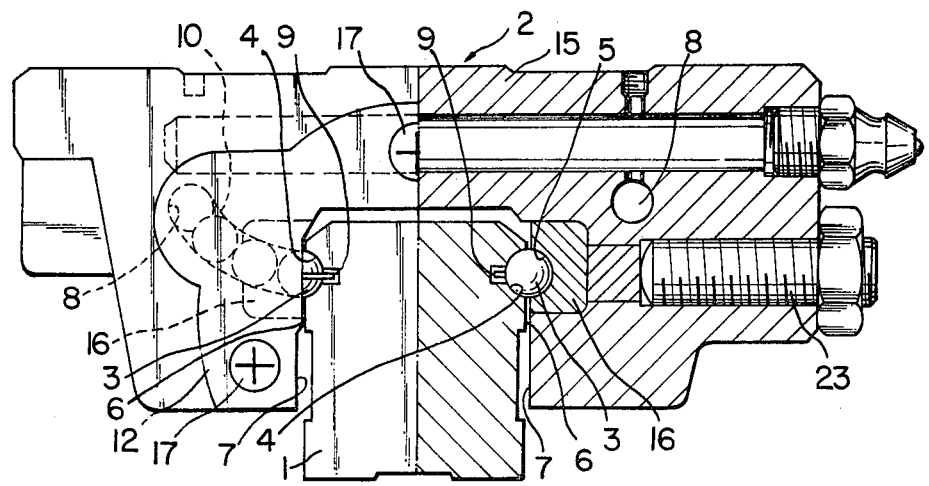
FIG. 3 is an elevational view and shows the cross section taken along line 3—3 of FIG. 1 at the right half portion thereof.

Also, as shown in FIG. 2 and FIG. 3, on body 15 of the slide unit 2, there are provided return holes 8 being the no load zones and which are made into parallel linear paths and which are parallel to said track surfaces 5.

Figure 4:
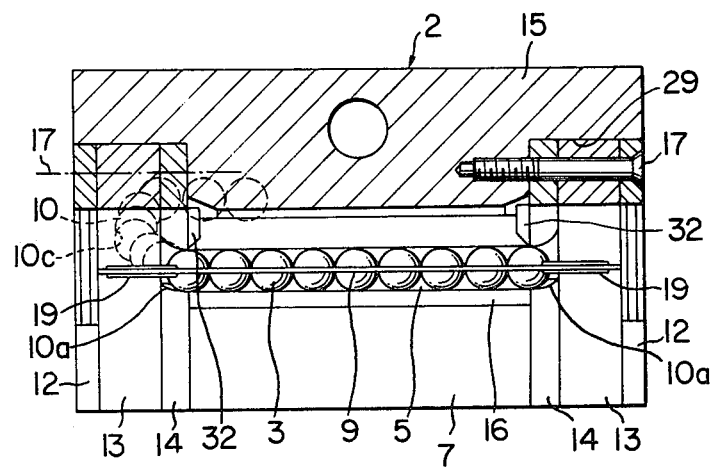
FIG. 4 is a central longitudinal cross section of the slide unit.

As shown in FIG. 4, at both ends of said track plate 16 and return hole 8, there are assembled on both ends of body 15, track plate retainer 14, side plate 13 and seal 12 in that order contacting each other and fastened by screws 17, 17 onto body 15.

As shown in FIG. 2 through FIG. 4, on said track plate retainer 14 and side plate 13, there are provided direction changing paths 10 which respectively connect both ends of track surfaces 5 which are the load zone and of return holes 8 which are the no load zone. And thus, a circulating path in which a group of balls endlessly circulates is arranged by track surface 5 and return hole 8 which are both of linear paths and by said direction changing paths 10, 10 provided at both ends of said linear paths.

Figure 5:
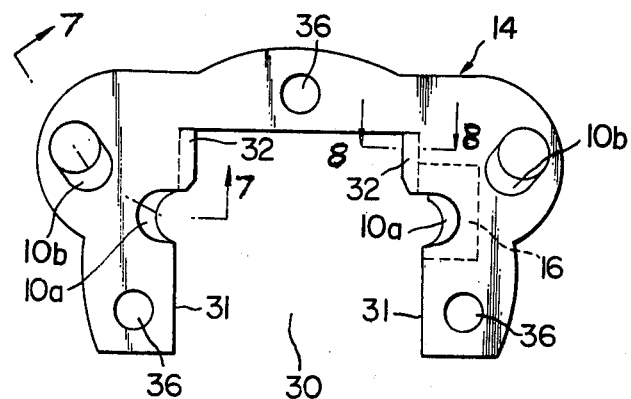
FIG. 5 is an elevational view showing the outer end surface of the track plate retainer.
Figure 9:
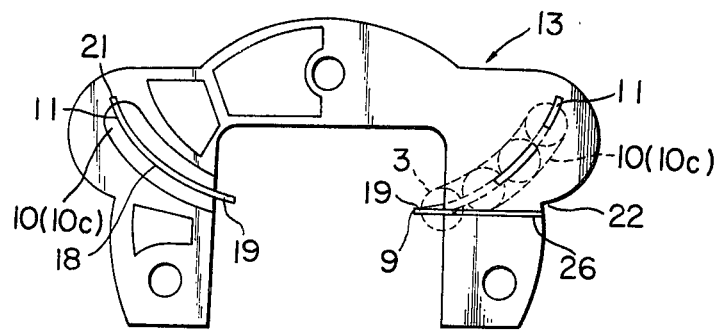
FIG. 9 is an elevational view of the side plate in which the left half portion shows the back side and the right half portion shows the front side.

The arrangement of said direction changing path 10 is further explained in detail, as mentioned below. Namely, it consists of, as shown in FIG. 5, a short direction changing path end portion 10a, which is provided on track plate retainer 14, and which when assembled connects to said track surface 5, a short direction changing path end portion 10b which connects to return hole 8, and, as shown in FIG. 9, a direction changing path main portion 10c which is provided on said side plate 13, and which when assembled connects to said direction changing path end portions 10a, 10b. Further, this direction changing path main portion constitutes the major portion of the direction changing path.

The arrangement of said direction changing path 10 is generally a spatial circular curve, and the shape projected on a plane which includes both axes of track surface 5 and return hole 8 is substantially a half circular surface so as to make the direction change of the balls smooth. Also, as shown in FIG. 9, the shape projected on a plane which is perpendicular to the axis of said track rail 1 is a partial circular arc which is a smooth curve that connects between said return hole 8 provided at the inclined upper portion of body 15 of the slide unit 2 and said track surface 5 provided at the inclined lower portion of body 15. Particularly, the portion where it connects to track surface 5 is arranged in a horizontal direction so as to allow a smooth direction change of the ball 3.

Figure 10:
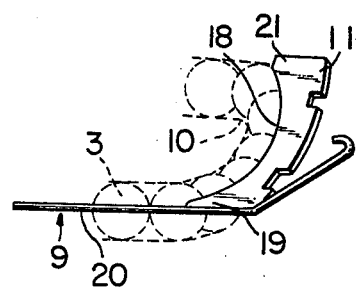
FIG. 10 is a perspective view showing the engagement between the ball retainer and the guide plate.

Also, the innermost peripheral surface of direction changing path main portion 10c of the side plate 13 is the peripheral surface on which the direction changing ball 3 always makes contact and rolls. As shown in FIG. 9 and FIG. 10, a steel guide plate 11 having an edge surface 18 so curved to coincide with the curve of the spatial circular curve provided by the direction changing path 10 is embedded so that its surface is flush with the direction changing path 10. Side plate 13 is made of plastic material which is injection molded with said guide plate 11 being integrally embedded and the previously mentioned shape of the direction changing path 10c being simultaneously formed during injection molding.

As shown in FIG. 4, FIG. 9 and FIG. 10, said guide plate 11 is arranged so that its lower tip end 19 is located in a position where it contacts main body 20 of ball retainer 9 in a manner that said edge surface 18 is tangential to the linear main body 20 of said ball retainer 9 so as to be able to smoothly pick up the group of balls rolling on track surface 5, and that its upper tip end 21 is located in a position where said edge surface 18 is tangential to the peripheral surface of said return hole 8 so as to make a smooth rolling of the group of balls between the direction changing path 10 and the return hole 8.

Figure 11:
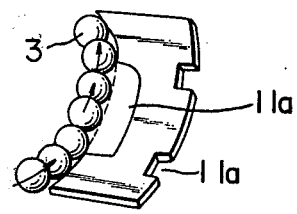
FIG. 11 is a perspective view showing the relationship between the guide plate having another shape and the group of balls.
Figure 12:
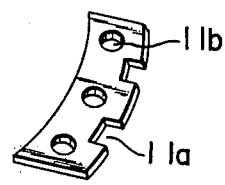
FIG. 12 is a perspective view of the guide plate having another shape.

Also, said guide plate 11 can be provided with cuts 11a and 11b, as shown in FIG. 11 and FIG. 12, in order to strengthen the joining between the plastic material which forms the side plate 13.

A further detailed description is now made on said track plate retainer 14 by FIG. 5 through FIG. 8.

Figure 6:
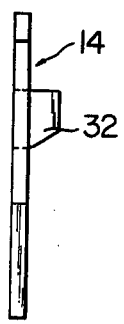
FIG. 6 is a side view of above.
Figure 8:
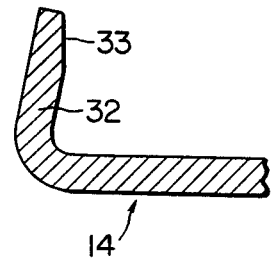
FIG. 8 is an enlarged cross sectional view taken along line 8—8 of FIG. 5.

Track plate retainer 14 is a plate shaped member as shown in FIG. 5 and FIG. 6, and has a channel shaped recess 30 formed for mounting on said track rail 1. At the top ends of both inner side edges of said recess 30, claw members 32 project, which when said track plate retainer 14 is mounted on body 15, contact the inner sides of said track plates 16 immediately above track surfaces 5 of said track plates 16. Each claw member 32 is bent substantially perpendicular to the plate shaped track plate retainer 14 at its inner side edge 31 and is short, projecting towards the side of the track plate 16. Said claw member 32 opposes the pressure imposed upon the track plate 16 by pressure bolt 23 from outside of body 15 which will be described later, and thus at contact surface 33 as shown in FIG. 8, has a resilient force tending to push the track plate 16 outwardly by contacting the inner side of the track plate 16.

Figure 7:
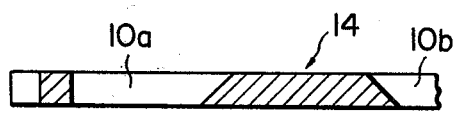
FIG. 7 is an enlarged cross sectional view taken along line 7—7 of FIG. 5.

Also, on track plate retainer 14, there are provided direction changing path end portions 10a, 10b which form part of previously described direction changing path 10. The direction changing path end portions 10a are provided in half circular shape at inner side edges 31 and are located at positions where they contact the end surfaces of half cylindrically shaped track surfaces 5 of track plates 16, and upon assembly connect to track surfaces 5 which are the load zone, forming part of the direction changing paths 10. The direction changing path end portions 10b are provided at positions where they contact the return holes 8, and upon assembly connect to said return holes 8 which are the no load zone, forming part of the direction changing paths 10. The direction changing path end portions 10a and 10b are provided along circular arc line 7—7 of FIG. 5 and, as shown in FIG. 5 and FIG. 7, are inclined to form a spatial circular arc shaped curved surface of direction changing path 10 which smoothly connects the track surface 5 and return hole 8.

Nextly, ball retainer 9 will be described in details by FIG. 9, FIG. 10 and FIG. 13 through FIG. 15.

Figure 13:
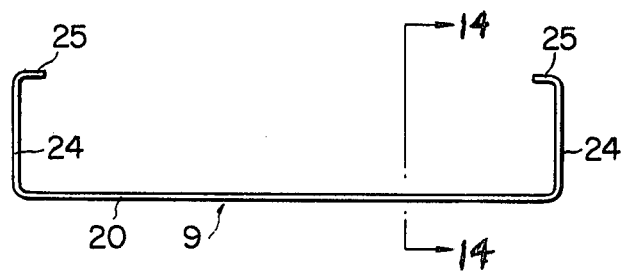
FIG. 13 is a plan view of the ball retainer.
Figure 15:
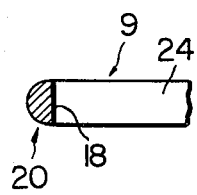
FIG. 15 is a cross section of another embodiment of the ball retainer.
Figure 14:
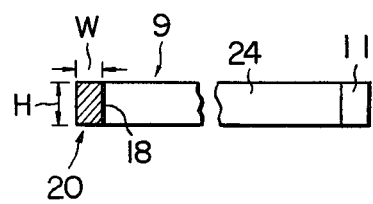
FIG. 14 is an enlarged cross section taken along line 14—14 of FIG. 13.

As shown in FIG. 2 and FIG. 4, ball retainer 9 is provided close to the inner side of balls 3 on the track surface 5 of the slide unit 2 and at substantially center position of the balls 3. Said ball retainer 9, as shown in FIG. 13, FIG. 14 and FIG. 10, consists of a metallic thin rod shaped member having a rectangular cross section in which the height H is approximately twice the width W, or, as shown in FIG. 15, consists of an approximately half circular cross section. In either case, it is formed into an approximately flat channel shape in a plane, both ends of straight rod shape main member portion 20 being bent perpendicularly to form bent pieces 24, 24. Further, the end of each bent piece 24 is bent approximately perpendicularly towards the inside to oppose each other, thus forming hook shaped pieces 25, 25. Said main member portion 20 is arranged so that it approaches from outside of the balls 3 on the track surface 5, as previously described towards the center of the balls 3 opposing said track surface 5. The facing surface of said main member portion 20 against the balls 3 is formed to be flat.

Said ball retainer 9 is assembled onto the slide unit 2 as follows. Upon assembly of the slide unit 2, as shown in FIG. 2 through FIG. 4, said track plate retainer 14 and side plate 13 having groove 26 in a horizontal direction on the surface perpendicular to the direction of movement of body 15 are fitted successively onto the mounting recess 29 at front and rear ends of direction of movement of body 15 of slide unit 2. Then, the group of balls 3 is filled into the return hole 8 and on track surface 5. Further, as shown in FIG. 4 and right side portion of FIG. 9, the ball retainer 9 is inserted into the groove 26 of the side plate 13 and the hook shaped piece 24 engages the side plate 13. The main member portion 20 of the ball retainer 9 is allowed to contact the train of balls 3 on track surface 5, thus preventing the balls 3 from falling out of the track surface 5. Then, seal 12 is fitted into the mounting recess 29 to a position where it will externally contact said side plate 13. Then by screws 17, said seal 12, side plate 13 and track plate retainer 14 are screw fastened onto the body 15, thus completing the assembly.

The direction changing path 10 of the circulating path in which the group of balls of slide unit of the present invention endlessly circulate is generally a spatial circular curve and the shape projected on a plane which includes both axes of track surface 5 and return hole 8 is substantially a half circular surface so as to make the direction change of the ball smooth. Also, as shown in FIG. 2 and FIG. 3, the shape projected on a plane which is perpendicular to the axis of said track rail 1 is a partial circular arc which is a smooth curve that connects between said return hole 8 provided at the inclined upper portion of body 15 of the slide unit 2 and said track surface 5 provided at the inclined lower portion of body 15 at the inner surface 7. Particularly, the portion where it connects to track surface 5 is arranged in a horizontal direction so as to allow a smooth direction change of the ball 3.

Figure 16:
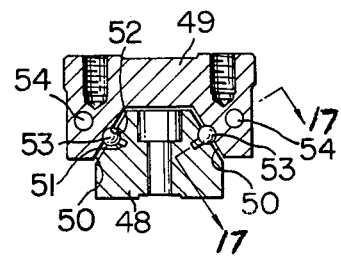
FIG. 16 is a cross section taken on a plane perpendicular to the direction of movement of a prior art endlessly sliding ball bearing.
Figure 17:
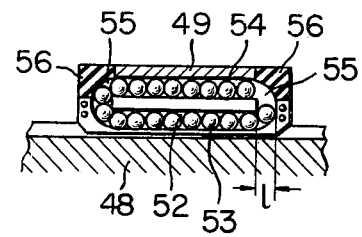
FIG. 17 is a cross sectional view taken along line 17—17 of FIG. 16.

As described previously, the return hole 8 and the track plate 5 are arranged at an inclined upper and an inclined lower positions. Thus, although the projections of said return hole 8 and back plate 5 on both the vertical plane and the horizontal plane are close to each other, since the direction changing path 10 which connects said return hole 8 and track plate 5 is a spatial circular arc curve shape, it has a curved surface which is relatively long and smooth, with small curvature. Thus, no abrupt change of direction of the balls is made, which was the defect of the prior art as shown in FIG. 16 and FIG. 17, and the resistance of the endless circulation of the balls is very small. Also, since the return hole 8 is located at a position inclined upward from the track surface 5, the slide unit 2 was able to be made compact.

Further, the previously described direction changing path 10, having a spatial circular arc curve shape, is such that the members enclosing said path 10 are divided into two, namely, track plate retainer 14 and side plate 13. It therefore is possible to manufacture the direction changing path 10 having a complex shape.

As described previously, in the slide unit 2 according to the present invention track surfaces 4 and 5 are provided on the vertical outer surface 6 and the inner surface 7, respectively. Therefore, it is necessary to support the load by holding the balls 3 between said track surfaces 4, 5 so that it is horizontally pressed, which is performed, as shown in FIG. 3, by the preload bolt 23 pressing the track plate 16 towards track rail 1. However, since said track plate 16 is forced towards the preload bolt 23 by the claw member 32 of track plate retainer 14, whether the preload bolt 23 advances or retracts, there will be no play between the track plate 16 and the preload bolt 23, and also there will occur no play on the preload device, and the track plate 16 is securely fitted and supported on the body 15.

Also, as shown in FIG. 5 and FIG. 9, the contours of the side plate 13 and the track plate retainer 14 are generally a large circular shape, and the contour of the portion where the direction changing path end portion 10b, which constitutes part of the direction changing path 10 connecting said return hole 8, is provided, is a small ear like circular shape projecting both left and right inclined upward, and thus as a whole, they have a bear head like contour which is a shape very easy to process, and fastening holes 36, 36 where screws 17 are inserted are located at center top and left and right lower portions where they are away from the direction changing path, thus providing a shape which is compact and without waste.

In the slide unit of the present invention, as described previously, the direction changing path, in which the steel guide plate is integrally embedded, is formed in the side plate of plastic material which is injection molded. Thus, since it is possible to injection mold the direction changing path having a complex spatial circular curve shape in one operation, quantity production is possible, allowing low manufacturing cost, and light weight. Also, in said direction changing path, since the steel guide plate is embedded at a location where the direction changing ball is contacting most severely, almost no wear is produced at the direction changing path. Thus, quantity production of light and rigid side plate became possible, along with high machining accuracy and maintenance of uniformity.

Also, in the plate shaped track plate retainer of the slide unit of the present invention, there are provided, the direction changing path end portions which constitute part of the direction changing path having spatial circular arc shaped curved surface forming the circulating path of the ball, and resilient claw members bent and projecting at the upper inner edges for forcing the track plate always towards the outside. Upon assembly of the slide unit, said track plate retainer forms the direction changing path with the side plate and prevents abrupt change of the direction of the balls circulating between the track surface and the return hole. Thus, arrangement is made so that there will be no increase in circulating sliding resistance as the slide unit slides. Also, the claw members exert a force on the track plates which is in the opposite direction to that of the pressing force of the preload device which imposes a proper horizontal pressing force which is necessary for the balls which support the load and roll, at the load zone between the track surface of the track rail and the track surface of the slide unit, both being provided on the vertical surfaces. Thus, there will occur no play between the preload device and the track plates, and it is possible to always apply proper pressing force according to the load capacity, and further, since the axial length of the track surface can be made maximum, it is possible to obtain a ball bearing for linear motion which has large load capacity compared to its length and which is also compact.

The ball retainer which engages on the track surface of the slide unit of the present invention has a cross section and a bent shape described previously. Thus, although it is a simple rod shape, the surface facing the balls on the track surface of the slide unit is rather larger, thus, the balls can be securely held and its retaining accuracy is high. Also its projection towards the track surface side of the track rail is small at its installed position. Also since it is engaged on the groove of the side plate utilizing the resilient force of the hook shaped piece and the bent piece, installation and removal are easy, and moreover, the required area for engagement with the side plate is especially small in the axial direction, and such less required amount will produce larger effective contact length between both track surfaces and the groups of balls, and thus, even if the outside dimensions of the slide unit are same, it is possible to increase the load capacity of the ball bearing for linear motion as a whole.

I claim:

1. In a ball bearing slide unit for linear motion wherein said slide unit is mounted on a track rail of rectangular cross section which is provided with linear track surfaces symmetrically at the both vertical side surfaces, is provided with track surfaces opposing said track surfaces on said track rail, with linear return holes running parallel to said track surfaces, and with direction changing paths which connect the both ends of said track surfaces and said return holes respectively, and is formed with circulating paths where groups of balls endlessly circulate supporting a load and rolling between both track surfaces, a plastic side plate of the slide unit of ball bearing for linear motion, characterized in that said plastic side plate, is formed with direction changing paths having circular arc shape for connecting the ends of linear paths consisting of track surfaces which are the load zone and the return holes which are the no load zone of said circulating paths respectively, allows a smooth direction change movement of the balls from the load zone to the no load zone, and is embedded with a steel guide plate at the innermost peripheral surfaces of said direction changing paths, said steel guide plate having a circular arc edge surface which is flush with said direction changing paths and being integrally molded with said plastic side plate.

2. In a ball bearing slide unit for linear motion wherein said slide unit is mounted on a track rail of rectangular cross section which is provided with linear track surfaces symmetrically at the both vertical side surfaces, is provided with track surfaces opposing said track surfaces on said track rail, with linear return holes running parallel to said track surfaces, and with direction changing paths which connect the both ends of said track surfaces and said return holes respectively, and is formed with circulating paths where groups of balls endlessly circulate supporting a load and rolling between both track surfaces, a track plate retainer of the slide unit of ball bearing for linear motion, characterized in that said track plate retainer, is mounted on both end surfaces of said slide unit body externally contacting both the ends of the track plates having track surfaces of half cylindrical shape which are fitted symmetrically on the channel shaped inner surfaces of said slide unit body at positions opposing the track surfaces of said track rail and the ends of said return holes, is plate shaped forming part of said direction changing paths with the side plate which is further externally mounted, is formed with a recess of downward facing channel shape for mounting on said track rail, said recess having resilient short claw members which are perpendicularly bent and projecting at the top ends of its both inner edges, said claw members forcing the inner ends of the track plates towards outside at immediately above the ends of the track surfaces of said track plates, is provided, at its position contacting the track surface end of said track plate, with half circular shape cuts which connect to track surfaces of the load zone, thus forming part of the direction changing path, and is also provided, at its position contacting the ends of said return holes, with circular holes which connect to return holes, thus forming part of the direction changing path, the side surfaces of said cuts and said circular holes at the side where they contact said side plate being formed slanted so as to form spatial circular arc shaped curved surfaces.

3. In a ball bearing slide unit for linear motion wherein said slide unit is mounted on a track rail of rectangular cross section which is provided with linear track surfaces symmetrically at the both vertical side surfaces, and is provided with track surfaces opposing said track surfaces on said track rail, with linear return holes running parallel to said track surfaces, and with direction changing paths which connect the both ends of said track surfaces and said return holes respectively, and is formed with circulating paths where groups of balls endlessly circulate supporting a load and rolling between both track surfaces, a ball retainer of the slide unit of ball bearing for linear motion, characterized in that said ball retainer, is mounted on the slide unit opposing the track surface of the slide unit for preventing the group of balls rolling linearly between the track surface of said track rail and the opposing track surface of the slide unit from falling out of the track surfaces of the slide unit, is made by a thin metallic rod member, the cross section of which is such that the height is twice as large as its width, is made into a substantially flat channel shape in a plane, is formed to have a main member portion of straight rod shape, bent pieces bent perpendicularly from both ends thereof and hook shaped pieces at the tip of said bent pieces, and is engagingly hooked onto the side plates assembled on both ends at the direction of movement of the slide unit body through said bent pieces and said hook shaped pieces.

4. A ball bearing slide unit for linear motion wherein said slide unit is mounted on a track rail of rectangular cross section which is provided with linear track surfaces symmetrically at the both vertical side surfaces, and is provided with track surfaces opposing said track surfaces on said track rail, with linear return holes running parallel to said track surfaces, and with direction changing paths which connect the both ends of said track surfaces and said return holes respectively, and is formed with circulating paths where groups of balls endlessly circulate supporting a load and rolling between both track surfaces, characterized in that said slide unit includes:

plastic side plates of the slide unit of ball bearing for linear motion, characterized in that said plastic side plates, are formed with direction changing paths having circular arc shape for connecting the ends of linear paths consisting of track surface which is the load zone and the return hole which is the no load zone of said circulating paths respectively, allow smooth direction change movement of the balls from the load zone to the no load zone, and are embedded with steel guide plate at the innermost peripheral surface of said direction changing paths, said steel guide plate having circular arc edge surface which is flush with said direction changing paths and being integrally molded with said plastic side plates;

track plate retainers of the slide unit of ball bearing for linear motion, characterized in that said track plate retainers, are mounted on both end surfaces of said slide unit body externally contacting both the ends of the track plates of rod shaped members having track surfaces of half cylindrical shape which are fitted symmetrically on the channel shaped inner surfaces of said slide unit body at positions opposing the track surfaces of said track rail and the ends of said return holes, are plate shaped forming part of said direction changing paths with the side plate which is further externally mounted, are formed with recess of downward facing channel shape for mounting on said track rail, said recess having resilient short claw members which are perpendicularly bent and projecting at the top ends of its both inner edges, said claw members forcing the inner ends of the track plates towards outside at immediately above the ends of the track surfaces of said track plates, are provided, at position contacting the track surface end of said track plate, with half circular shape cuts which connect to track surfaces of the load zone, thus forming part of the direction changing path, and are also provided, at position contacting the ends of said return holes, with circular holes which connect to return holes, thus forming part of direction changing path, the side surfaces of said cuts and said circular holes at the side where they contact said side plate being formed slanted so as to form spatial circular arc shaped downward surfaces, and ball retainers of the slide unit of ball bearing for linear motion, characterized in that said ball retainers, are mounted on the slide unit opposing the track surface of the slide unit for preventing the groups of balls rolling linearly between the track surface of said track rail and the opposing track surface of the slide unit from falling out of the track surface of the slide unit, are made by thin metallic rod member, the cross section of which is such that the height is twice as large as its width, is made into a substantially flat channel shape in a plane, are formed to have a main member portion of straight rod shape, bent pieces bent perpendicularly from both ends thereof and hook shaped pieces at the tip of said bent pieces, and are engagingly hooked onto the side plates assembled on both ends at the direction of movement of the slide unit body through said bent pieces and said hook shaped pieces.

* * * * *

UNITED STATES PATENT AND TRADEMARK OFFICE
CERTIFICATE OF CORRECTION

PATENT NO. : 4,390,215
DATED : June 28, 1983
INVENTOR(S) : TATSUO MOTTATE

It is certified that error appears in the above-identified patent and that said Letters Patent is hereby corrected as shown below:

In the abstract, column, line 16, change "furtehr" to
   --further--;

Column 1, line 55, change "and right directions," to
   --and right directions.--;

Column 6, line 48, change "and back plate 5" to --and
   track plate 5--;

Column 10, line 44, change "arc shaped downward surfaces"
   to --arc shaped curved surfaces--.

Signed and Sealed this

Twenty-ninth Day of November 1983

[SEAL]

Attest:

GERALD J. MOSSINGHOFF

Attesting Officer     Commissioner of Patents and Trademarks